United States Patent
Asano et al.

(10) Patent No.: US 10,575,177 B2
(45) Date of Patent: Feb. 25, 2020

(54) WIRELESS NETWORK SYSTEM, TERMINAL MANAGEMENT DEVICE, WIRELESS RELAY DEVICE, AND COMMUNICATIONS METHOD

(71) Applicant: Yamaha Corporation, Hamamatsu-shi, Shizuoka (JP)

(72) Inventors: Takahiro Asano, Hamamatsu (JP); Toshihiro Kimura, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 81 days.

(21) Appl. No.: 14/778,921

(22) PCT Filed: Mar. 17, 2014

(86) PCT No.: PCT/JP2014/057206
§ 371 (c)(1),
(2) Date: Sep. 21, 2015

(87) PCT Pub. No.: WO2014/148448
PCT Pub. Date: Sep. 25, 2014

(65) Prior Publication Data
US 2016/0050567 A1 Feb. 18, 2016

(30) Foreign Application Priority Data
Mar. 22, 2013 (JP) .................. 2013-059464

(51) Int. Cl.
*H04W 12/08* (2009.01)
*H04L 29/06* (2006.01)
(Continued)

(52) U.S. Cl.
CPC .............. *H04W 12/08* (2013.01); *H04B 7/15* (2013.01); *H04L 63/0236* (2013.01);
(Continued)

(58) Field of Classification Search
CPC ...... H04W 12/08; H04B 7/15; H04L 63/0236; H04L 63/20; H04L 63/205
See application file for complete search history.

(56) References Cited

U.S. PATENT DOCUMENTS 5,737,691 A * 4/1998 Wang .................... H04W 16/04
455/509
6,957,067 B1 * 10/2005 Iyer ..................... H04L 63/1416
370/338
(Continued)

FOREIGN PATENT DOCUMENTS

CN 101051891 A 10/2007
JP 2004-310581 A 11/2004
(Continued)

OTHER PUBLICATIONS

Chadha et al., "Policy-Based Mobile Ad Hoc Network Management", Jun. 2004, Fifth IEEE International Workshop on Policies for Distributed Systems and Networks, pp. 35-44 (Year: 2004).*
(Continued)

Primary Examiner — Kenneth W Chang
(74) Attorney, Agent, or Firm — Crowell & Moring LLP

(57) ABSTRACT

Provided is a technology for allowing only a wireless terminal satisfying a security policy to be connected to an in-company network without causing a significant increase in costs. The terminal management device including a determination part communicating with a wireless terminal via a different communication network from the wireless network system, and determining whether or not the wireless terminal satisfies a predetermined security policy, and a connection information transmission part transmitting connection information for connection to the wireless relay device to the wireless terminal which is determined to satisfy the security policy by the determination part is provided in a wireless network system that includes a
(Continued)

wireless access point device constituting an in-company network and connecting a wireless terminal for which predetermined connection information has been set.

22 Claims, 3 Drawing Sheets

(51) Int. Cl.
| | | |
|---|---|---|
| *H04B 7/15* | (2006.01) | |
| *H04W 16/26* | (2009.01) | |
| *H04W 48/08* | (2009.01) | |
| *H04W 84/12* | (2009.01) | |

(52) U.S. Cl.
CPC ............ *H04L 63/20* (2013.01); *H04L 63/205* (2013.01); *H04W 16/26* (2013.01); *H04W 48/08* (2013.01); *H04W 84/12* (2013.01)

(56) References Cited

U.S. PATENT DOCUMENTS

| | | | | | |
|---|---|---|---|---|---|
| 7,277,547 | B1* | 10/2007 | Delker | ................ | H04L 63/0272 380/270 |
| 2004/0064727 | A1* | 4/2004 | Yadav | ................ | H04L 63/0227 726/1 |
| 2004/0068668 | A1* | 4/2004 | Lor | ........................ | H04L 63/107 726/15 |
| 2004/0213172 | A1* | 10/2004 | Myers | ................ | H04L 63/1466 370/313 |
| 2005/0246767 | A1* | 11/2005 | Fazal | .................... | H04L 63/065 726/11 |
| 2005/0266826 | A1* | 12/2005 | Vlad | .................... | H04L 63/0492 455/410 |
| 2006/0153122 | A1* | 7/2006 | Hinman | ................... | H04L 63/10 370/328 |
| 2006/0172736 | A1* | 8/2006 | Nevo | ..................... | H04W 48/18 455/435.1 |
| 2007/0088948 | A1* | 4/2007 | Ji | .......................... | H04L 63/102 713/166 |
| 2007/0206527 | A1* | 9/2007 | Lo | ........................ | H04L 63/0272 370/328 |
| 2007/0266422 | A1* | 11/2007 | Germano | ............ | H04L 63/0263 726/1 |
| 2008/0147882 | A1* | 6/2008 | Reif | ....................... | H04W 8/183 709/238 |
| 2008/0220741 | A1* | 9/2008 | Hung | .................... | H04W 12/06 455/411 |
| 2010/0064341 | A1* | 3/2010 | Aldera | .................. | H04L 63/102 726/1 |
| 2010/0077466 | A1* | 3/2010 | Lowe | .................... | H04L 63/062 726/6 |
| 2011/0058500 | A1* | 3/2011 | Nagasaki | .............. | H04W 8/183 370/254 |
| 2011/0081890 | A1 | 4/2011 | Ahmadvand et al. | | |
| 2011/0296501 | A1* | 12/2011 | Drovdahl | ................ | H04L 63/18 726/4 |
| 2012/0129503 | A1* | 5/2012 | Lindeman | ............. | H04W 4/001 455/414.1 |
| 2012/0146918 | A1* | 6/2012 | Kreiner | ............... | H04M 1/7253 345/173 |
| 2012/0163206 | A1* | 6/2012 | Leung | ................... | G01S 5/0009 370/252 |
| 2012/0254939 | A1* | 10/2012 | Lum | ....................... | H04L 63/20 726/1 |
| 2013/0115915 | A1* | 5/2013 | Tipton | ................... | H04W 12/08 455/411 |
| 2014/0092891 | A1 | 4/2014 | Ahmadvand et al. | | |

FOREIGN PATENT DOCUMENTS

| | | |
|---|---|---|
| JP | 2004-336538 A | 11/2004 |
| JP | 2005-86471 A | 3/2005 |
| JP | 2005-167884 A | 6/2005 |
| JP | 2006-331128 A | 12/2006 |
| JP | 2007-6320 A | 1/2007 |
| JP | 2008-236445 A | 10/2008 |
| JP | 2012-134703 A | 7/2012 |
| JP | 2013-507077 A | 2/2013 |

OTHER PUBLICATIONS

Japanese Office Action issued in counterpart Japanese Application No. 2013-059464 dated Feb. 7, 2017 with English-language translation (five (5) pages).
International Search Report (PCT/ISA/210) issued in PCT Application No. PCT/JP2014/057206 dated Jun. 3, 2014 with English translation (Eight (8) pages).
Japanese-language Written Opinion (PCT/ISA/237) issued in PCT Application No. PCT/JP2014/057206 dated Jun. 3, 2014 (Five (5) pages).
Kubota et al., "Development of iNetSec Inspection Center V7.0—Achieving Smart Device Inspections-", PFU Tech. Rev., Nov. 2012, vol. 23, No. 2, No. 44, pp. 1 to 7 (Ten (10) pages).
Hikawa, "MDM to Switch Work and Private Mode according to Destination Network, Basic Announced", Sep. 10, 2012, Nikkei BP, searched on Mar. 21, 2013, Japan, URL http://itpro.nikkeibp.co.jp/article/NEWS/20120910/421722/ (Three (3) pages).
Chinese-language Office Action issued in counterpart Chinese Application No. 201480017480.0 dated Dec. 11, 2017 with partial English translation (Thirteen (13) pages).
Indonesian-language Office Action issued in counterpart Indonesian Application No. P00201505888 dated Nov. 19, 2018 with English translation (four (4) pages).

\* cited by examiner

WIRELESS NETWORK SYSTEM, TERMINAL MANAGEMENT DEVICE, WIRELESS RELAY DEVICE, AND COMMUNICATIONS METHOD

TECHNICAL FIELD

The present invention relates to a technology for allowing only a terminal satisfying a predetermined security policy, such as no security hole, to be connected to a wireless network system.

BACKGROUND ART

Smart devices such as smartphones or tablet terminals are rapidly spreading. These types of smart devices are different from a conventional personal digital assistant (PDA) or a conventional notebook computer, and have various functions such as an application program execution function, a communication function, and an imaging function. Accordingly, this type of smart device is often used for personal use as well as for the work of a user, and introduction of bring your own devices (BYODs) spread with the spread of smart devices. Specifically, when an in-company network provided in a company building of a place of work of a user includes a wireless local area network (LAN), a smart device owned by the user is connected to the in-company network via the wireless LAN and used for the work of the user.

In the BYOD, in order to prevent intrusion of virus into the in-company network or indiscretion, it is common to permit only a terminal device satisfying a predetermined security policy to connect to the in-company network. It is common for the smart device to connect to the in-company network via a wireless LAN included in the in-company network. Therefore, a quarantine system corresponding to a wireless network system such as a wireless LAN is required to realize the BYOD for the smart device. The quarantine system is a system for checking if a terminal device attempting to connect to the in-company network satisfies a predetermined security policy. Related art regarding this type of quarantine system includes the technology disclosed in Patent Literature 1 or Non-Patent Literature 1.

In Patent Literature 1, it is described that the in-company network is logically divided using a virtual local area network (VLAN), and one of the VLANs plays the role of a "quarantine VLAN". According to the technology disclosed in Patent Literature 1, when the terminal device connects to the in-company network, the terminal device first connects to the quarantine VLAN and checks if the terminal device satisfies the security policy, the terminal device connects to a VLAN for work when the terminal device satisfies the security policy, and thus, quarantine of a personal terminal is realized. Meanwhile, Non-Patent Literature 1 discloses a technology for preventing the leakage of confidential information by installing, in the terminal, dedicated software that monitors a connection destination in real time, identifying whether the connection destination is an in-company network or another network such as a general public line, and switching, for example, the communication setup of the terminal according to an identification result (for example, web access to outside of the company during connection to the in-company network is prevented).

CITATION LIST

Patent Literature

Patent Literature 1: JP-A-2006-331128

Non-Patent Literature

Non-Patent Literature 1: Keizo HIKAWA, "MDM to Switch Work and Private Mode according to Destination Network, Basic Announced", [online], Sep. 10, 2012, Nikkei BP, searched on Mar. 21, 2013, Internet <URL http://itpro.nikkeibp.co.jp/article/NEWS/20120910/421722/>

SUMMARY OF INVENTION

Technical Problem

In the technology disclosed in Patent Literature 1, there are problems in that the system is complicated and costs for initial setup or operation increases since it is necessary to divide the in-company network into a plurality of VLANs. On the other hand, in the technology disclosed in Non-Patent Literature 1, there is a problem in that connection to the in-company network may be performed with a fraudulent setup since the setup of the terminal is not switched until the terminal connects to the in-company network.

The present invention has been made in view of the above problems, and an object thereof is to provide a technology for allowing only a wireless terminal satisfying a security policy to be connected to an in-company network without causing a significant increase in costs.

Solution to Problem

In order to solve the problem, according to an aspect of the present invention, there is provided a wireless network system including a wireless relay device and a terminal management device, in which the terminal management device includes a determination part, configured to communicate with a wireless terminal via a different communication network from the wireless network system, and determine whether or not the wireless terminal satisfies a predetermined security policy, and a connection information transmission part, configured to transmit connection information to the wireless terminal which is determined to satisfy the security policy by the determination part.

According to the aspect of the present invention, it is determined by the terminal management device whether or not the wireless terminal satisfies the security policy, and the connection information is transmitted from the terminal management device to the wireless terminal only when the wireless terminal satisfies the security policy. In this case, the connection information may be transmitted via a different communication network from the wireless network system. Here, when there is no connection information, the wireless terminal cannot connect to the wireless relay device (specifically, wireless access point device), and thus, it is possible to reliably prevent the connection of a wireless terminal that does not satisfy the security policy. Further, according to the aspect of the present invention, it is not necessary to provide a quarantine VLAN for determining whether or not the wireless terminal satisfies the security policy, and thus, an increase in costs is not caused. Therefore, when the in-company network is built using the wireless network system of the present invention as a wireless network system for accommodating the wireless terminal, it is possible to realize that only a wireless terminal satisfying the security policy is connected to the in-company network without causing a significant increase in costs.

In the aspect, it is considered that the wireless network system further includes a detection device that detects that the wireless terminal enters a service area of the wireless network system, in which the terminal management device uses the determination part to perform a determination as to the security policy on the wireless terminal which is detected by the detection device.

According to the aspect, it is possible to perform quarantine of the wireless terminal immediately before the wireless terminal enters a service area of the wireless network system and connection to the wireless network system is attempted, and it is possible to suppress battery consumption of the wireless terminal compared to a case in which the quarantine of the wireless terminal is periodically performed.

In the aspect, an aspect in which a wireless relay device plays a role of the detection device may be considered. For example, when the wireless relay device is a wireless access point device, the wireless relay device (wireless access point device) is caused to detect that the wireless terminal enters the service area of the wireless relay device in response to reception of a probe request generated from the wireless terminal. According to the aspect, it is possible to suppress costs to be low due to no sensor compared to an aspect in which a sensor provided separately from the wireless relay device plays a role of the detection device.

As another aspect, an aspect in which the terminal management device is caused to periodically execute a process of communicating with the wireless terminal connected to the wireless relay device, via the wireless relay device, and performing a determination using the determination part, and the terminal management device is caused to execute a process of deleting connection information from the wireless terminal in response to the determination of the determination unit that the security policy is not satisfied may be considered. According to the aspect, it is possible to prevent generation of a security hole, such as change in the setup of the wireless terminal after connection to the wireless relay device.

In order to solve the problem, according to another aspect of the present invention, there is provided a terminal management device including determination part, configured to communicate with a wireless terminal via a different communication network from a wireless network system including a wireless relay device, and determine whether or not the wireless terminal satisfies a predetermined security policy, and a connection information transmission part, configured to transmit connection information for connection to the wireless relay device to the wireless terminal which is determined to satisfy the security policy by the determination part.

In order to solve the problem, according to still another aspect of the present invention, there is provided a wireless relay device included in a wireless network system, the wireless relay device including a terminal notification part, configured to notify a high-level device of a terminal identifier of a wireless terminal when radio wave intensity of a request message received from the wireless terminal exceeds a predetermined threshold value and the terminal identifier of the wireless terminal has been registered in advance, and an updating part, configured to update a filter for limiting wireless terminals of a communication partner according to an instruction from the high-level device.

In order to solve the problem, according to still another aspect of the present invention, there is provided a communications method including communicating with a wireless terminal via a different communication network from a wireless network system including a wireless relay device, and determining whether or not the wireless terminal satisfies a predetermined security policy, and transmitting connection information for connection to the wireless relay device to the wireless terminal which is determined to satisfy the security policy.

In order to solve the problem, according to still another aspect of the present invention, there is provided a communications method in a wireless relay device included in a wireless network system, the communications method including notifying a high-level device of a terminal identifier of a wireless terminal when radio wave intensity of a request message received from the wireless terminal exceeds a predetermined threshold value and the terminal identifier of the wireless terminal has been registered in advance; and updating a filter for limiting wireless terminals of communicating via the wireless relay device according to an instruction from the high-level device.

Also, when the wireless relay device is a wireless access point device, a specific example of the terminal identifier may include a MAC address, and an example of the filter may be a MAC address filter.

Further, the wireless relay device may further include a communication part, configured to connect to a wireless terminal acquiring connection information for connection to the wireless relay device via a different communication network from the wireless network system, and perform communication using the wireless network system with the wireless terminal.

For example, by including the wireless access point device functioning as the wireless relay device and the terminal management device in the wireless network system included in the in-company network, it is possible to realize that only a wireless terminal satisfying the security policy is connected to the in-company network via the wireless network system without causing a significant increase in costs.

DESCRIPTION OF EMBODIMENTS

Hereinafter, embodiments of the present invention will be described with reference to the drawings.

(A: Configuration)

Figure 1:
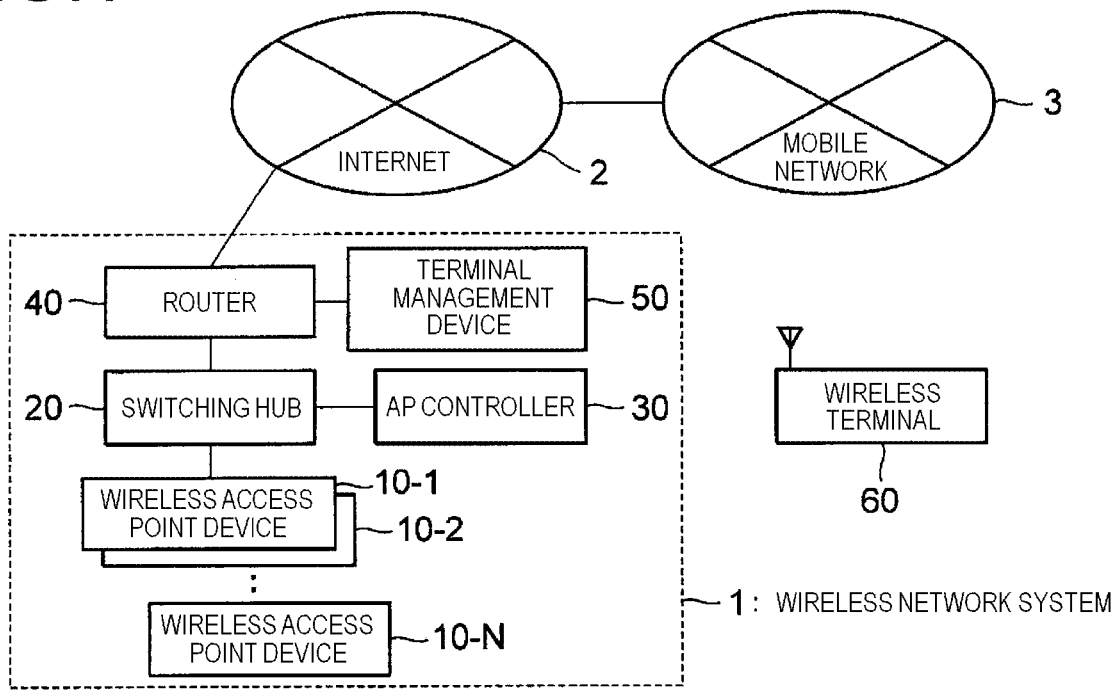
FIG. 1 is a block diagram illustrating an example of a configuration of a wireless network system 1 of an embodiment of the present invention.

FIG. 1 is a block diagram illustrating an example of a configuration of a communication system including a wireless network system 1 of an embodiment of the present invention. The wireless network system 1 is, for example, a wireless LAN provided in a building of a company, and forms an in-company network in the company together with a wired LAN (not illustrated in FIG. 1) provided in the building of the company. As illustrated in FIG. 1, the wireless network system 1 includes a wireless access point device 10-$n$ (n=1 to N: N is an integer equal to or greater than 2), a switching hub 20, an AP controller 30, a router 40, and a terminal management device 50. Also, hereinafter, when it is not necessary to distinguish each wireless access point device 10-$n$ (n=1 to N), the wireless access point device is referred to as a "wireless access point device 10". Each of the wireless access point device 10 and the AP controller 30 is connected to the switching hub 20 by a signal line such as a LAN cable. Each wireless access point device 10-$n$ (n=1 to N) is a device that connects a wireless terminal such as a smart device according to a protocol defined in IEEE802.11 or the like. In the present embodiment, each wireless access point device 10-$n$ is arranged at each place in the company building so that the inside of the company building in which the wireless network system 1 is provided is covered with an area in which radio communication waves emitted by each wireless access point device can be received with sufficient intensity (hereinafter, a service area of the wireless access point device).

Figure 2:
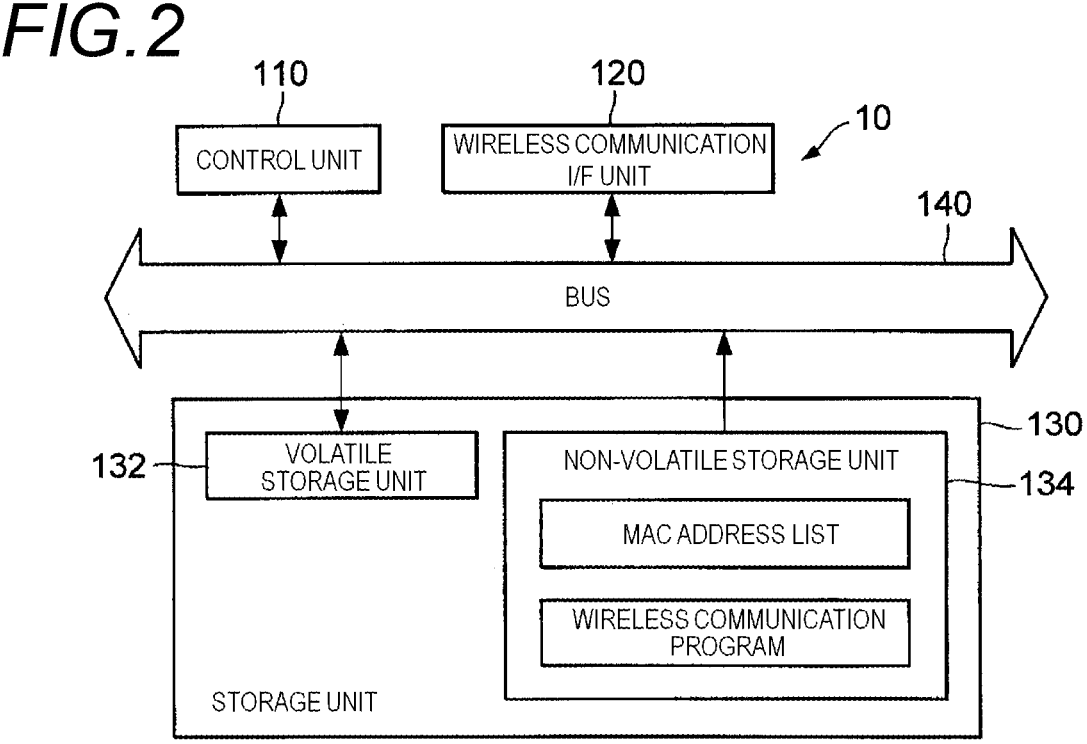
FIG. 2 is a block diagram illustrating an example of a configuration of a wireless access point device 10 included in the wireless network system 1.

FIG. 2 is a diagram illustrating an example of a configuration of the wireless access point device 10. The wireless access point device 10 includes a control unit 110, a wireless communication I/F unit 120, a storage unit 130, and a bus 140 that relays data exchange among these components, as illustrated in FIG. 2. The control unit 110 is a CPU (Central Processing Unit). The control unit 110 functions as a control center of the wireless access point device 10 by executing the program stored in the storage unit 130 (more precisely, non-volatile storage unit 134). The wireless communication I/F unit 120 includes, for example, an antenna, a modulation circuit, and a demodulation circuit (all not illustrated). The wireless communication I/F unit modulates the data received from the control unit 110, superimposes the data onto carrier waves, and transmits the carrier waves to a wireless section. Meanwhile, the wireless communication I/F unit demodulates the data superimposed onto the carrier waves received from the radio section, and provides the data to the control unit 110.

The storage unit 130 includes a volatile storage unit 132 and a non-volatile storage unit 134. The volatile storage unit 132 is, for example, a random access memory (RAM). The volatile storage unit 132 is used as a work area at the time of execution of various programs by the control unit 110. The non-volatile storage unit 134 is, for example, an electrically erasable programmable read-only memory (EEPROM). Data and programs that cause the control unit 110 to execute a process remarkably showing characteristics of the present embodiment are stored in the non-volatile storage unit 134.

An example of the data stored in the non-volatile storage unit 134 may include a MAC address list that is an array of data indicating MAC addresses of all wireless terminals applied for use for business among wireless terminals that are personal items owned by the company employee. Further, an example of the program stored in the non-volatile storage unit 134 may include a wireless communication program for causing the control unit 110 to execute a terminal notification process of detecting that a transmission source of the probe request enters a service area of the wireless access point in response to reception of the probe request generated by the wireless terminal and notifying a high-level device (in the present embodiment, AP controller 30) of the MAC address of the wireless terminal when the wireless terminal is a wireless terminal applied for use in advance. Further, the control unit 110 operating according to the wireless communication program also executes a process of updating the MAC address filter according to an instruction from the AP controller 30, similarly to a case in a typical wireless access point device.

The probe request refers to a communication message that the wireless terminal transmits to request broadcast of a network identifier (for example, ESSID) to a nearest wireless access point device. The wireless access point device 10 of the present embodiment is set not to perform regular broadcast of the network identifier and not to receive the probe request and perform broadcast of a network identifier or the like. This is intended to prevent unauthorized access caused by leakage of the network identifier to third parties or the like.

The AP controller 30 is a device for centrally managing a network identifier assigned to the wireless access point device 10-$n$ (n=1 to N), a used frequency (channel) of the wireless access point device 10-$n$, or setup of the MAC address filter in each wireless access point device 10-$n$. The AP controller 30 has a function of storing the terminal identifier in the wireless terminal connected to the wireless access point device 10-$n$ (information for identifying the wireless terminal; in the present embodiment, MAC address) for each wireless access point device 10-$n$, and detecting movement of the wireless terminals between the wireless access point device (so-called handover).

The switching hub 20 is connected to the router 40, and the terminal management device 50 is connected to this router 40. Also, the wired LAN forming an in-company network with the wireless network system 1 may be connected to the switching hub 20 or may be connected to the router 40. The router 40 is connected to the Internet 2, as illustrated in FIG. 1. That is, the wireless network system 1 is connected to the Internet 2 via the router 40. Also, a mobile network 3 conforming to a communication standard, such as 3G or Long Term Evolution (LTE), is connected to the Internet 2.

A wireless terminal 60 is a smart device owned by the employee of the company. The wireless terminal 60 has a function of establishing a wireless communication link with a base station (not illustrated) of the mobile network 3 and performing data communication (hereinafter, a first wireless communication function), and a function of connecting to the wireless access point device 10-$n$ (n=1 to N) and performing data communication (hereinafter, a second wireless communication function). Among the two wireless communication functions, the second wireless communication function can be switched between ON and OFF according to an instruction of the user. When the user instructs to turn the second wireless communication function ON, the wireless terminal 60 transmits the above-described probe request. Further, information indicating a host name assigned to the terminal management device 50 is stored in the wireless terminal 60 in advance. The wireless terminal 60 specifies the communication address (IP address) of the terminal management device 50 based on the host name, and performs data communication with the terminal management device 50 via the mobile network 3 and the Internet 2 using the first radio communication function described above.

Figure 3:
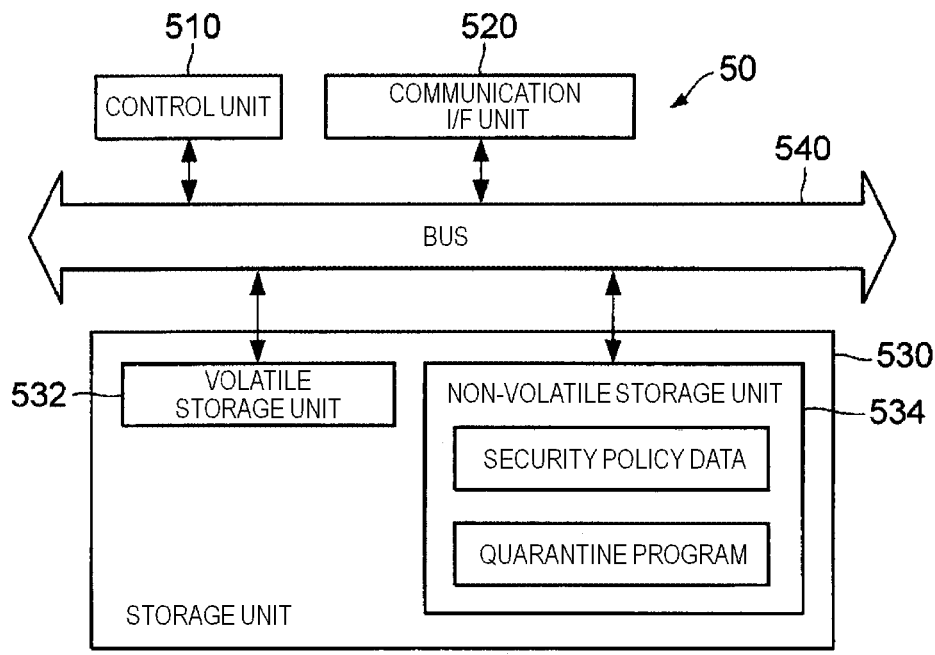
FIG. 3 is a block diagram illustrating an example of a configuration of a terminal management device 50 included in the wireless network system 1.

The terminal management device 50 is a so-called mobile device management (MDM) server. FIG. 3 is a diagram illustrating an example of a configuration of the terminal management device 50. The terminal management device 50 includes a control unit 510, a communication I/F unit 520, a storage unit 530, and a bus 540 that relays data exchange among these components, as illustrated in FIG. 3. The terminal management device 50 has, for example, an external device I/F unit to connect a user I/F unit for causing an operation manager to perform various operations, or another device, in addition to the above components, but the external device I/F unit is not illustrated and described since association with characteristics of the present embodiment is small.

The control unit 510 is a CPU, similarly to the control unit 110 in the wireless access point device 10, and functions as a control center of the terminal management device 50 by executing the program stored in the storage unit 530 (more precisely, the non-volatile storage unit 534). The communication I/F unit 520 is, for example, an NIC, and is connected to the router 40 via a signal line, such as a LAN cable. The communication I/F unit 520 provides data received from the router 40 via the signal line to the control unit 510, and transmits, via the signal line, data received from the control unit 510.

The storage unit 530 includes a volatile storage unit 532 and a non-volatile storage unit 534. The volatile storage unit 532 is, for example, a RAM. The volatile storage unit 532 is used as a work area at the time of execution of various programs by the control unit 510. The non-volatile storage unit 534 is, for example, a hard disk. Data and programs that cause the control unit 510 to execute a process remarkably showing characteristics of the present embodiment are stored in the non-volatile storage unit 534.

An example of the data stored in the non-volatile storage unit 534 may include data indicating a security policy in the company (hereinafter, security policy data). Specific examples of the security policy data may include data indicating types or versions of an operating system (OS) and application software to be installed in the terminal device connected to the wireless network system 1, and data indicating application software that should not have been installed in the terminal device. Although it will be described below in detail, the security policy data is used at the time of a determination as to whether or not the wireless terminal that is the transmission source of the probe request satisfies the security policy (that is, at the time of performing quarantine of the wireless terminal). Further, the connection information (for example, the network identifier of the wireless network system 1, information indicating an encryption method used for wireless communication with the wireless access point device 10, and information indicating a security key in the encryption) required to connect the wireless terminal to the wireless access point device 10 is also stored in the non-volatile storage unit 534 in advance (not illustrated in FIG. 3).

An example of the program stored in the non-volatile storage unit 534 may include a quarantine program that causes the control unit 510 to execute a quarantine process remarkably showing characteristics of the present embodiment. Although details are clarified in an operation example to avoid repetition of description, the control unit 510 operating according to the quarantine program functions as a determination part for communicating with the wireless terminal indicated by the MAC address via the Internet 2 and the mobile network 3 in response to notification of the MAC address from the AP controller 30, acquiring state information indicating a state of the terminal (data indicating a type or a version of an installed OS and application software), and determining whether or not the security policy indicated by the security policy data is satisfied. Further, the control unit 510 operating according to the quarantine program functions as connection information transmission part for transmitting the connection information to the wireless terminal determined to satisfy the security policy via the Internet 2 and the mobile network 3 and causing the connection information to be stored.

The above is a configuration of the wireless network system 1.

(B: Operation)

Next, an operation of the present embodiment will be described according to a flow until a user of the wireless terminal 60 attends an office, works and leaves the office.

Figure 4:
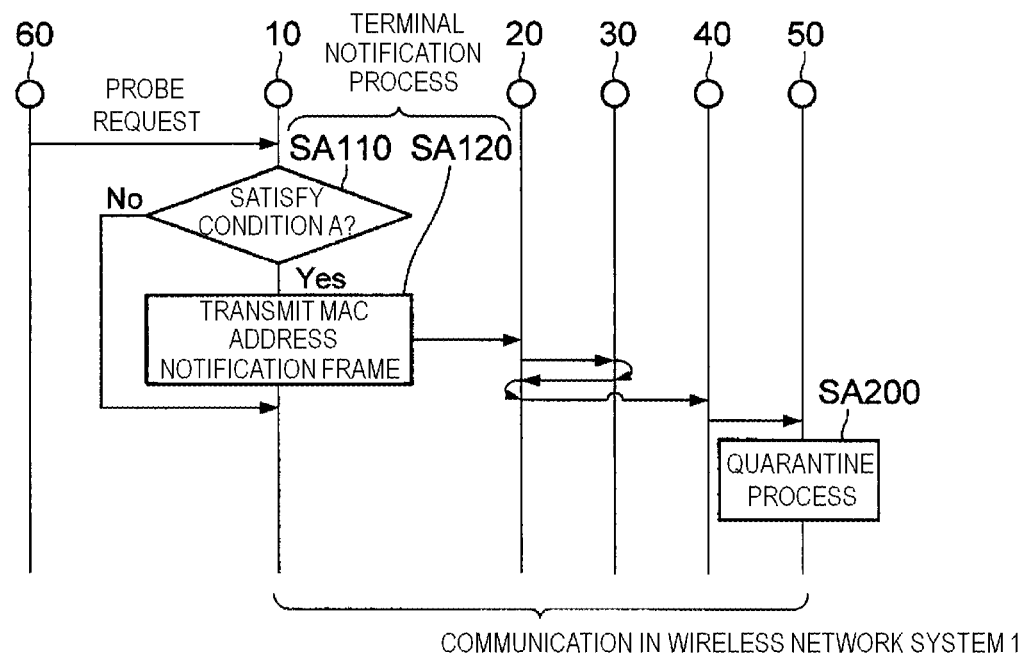
FIG. 4 is a diagram illustrating a communication sequence in the embodiment.

When an operation of turning the wireless communication function ON is performed by the user, the wireless terminal 60 transmits the above-described probe request (see FIG. 4). The control unit 110 of the wireless access point device 10 detects that the wireless terminal 60 enters the service area of the wireless access point device in response to the reception of the probe request transmitted from the wireless terminal 60, and starts execution of the terminal notification process. As illustrated in FIG. 4, the control unit 110 first determines whether or not the probe request satisfies predetermined conditions A (that is, a condition that intensity of radio waves exceeds a predetermined threshold value, and a condition that a transmission source is a wireless terminal applied for use in advance) (step SA110). Specifically, when a MAC address of a transmission source of the probe request has been registered in the MAC address list, the control unit 110 determines that the wireless terminal has been applied for use in advance. Also, when a determination result in step SA110 is "Yes", the control unit 110 transmits a frame in which the MAC address of the transmission source of the probe request is written to a payload portion (hereinafter, a MAC address notification frame) to the AP controller 30 (step SA120).

Thus, the MAC address notification frame transmitted from the wireless access point device 10 is received by the AP controller 30 via the relay of the switching hub 20. The AP controller 30 notifies the terminal management device 50 of the MAC address written to the received MAC address notification frame via the switching hub 20 and the router 40 (see FIG. 4). The control unit 510 of the terminal management device 50 starts execution of the quarantine process in response to the notification of the MAC address (step SA200).

Figure 5:
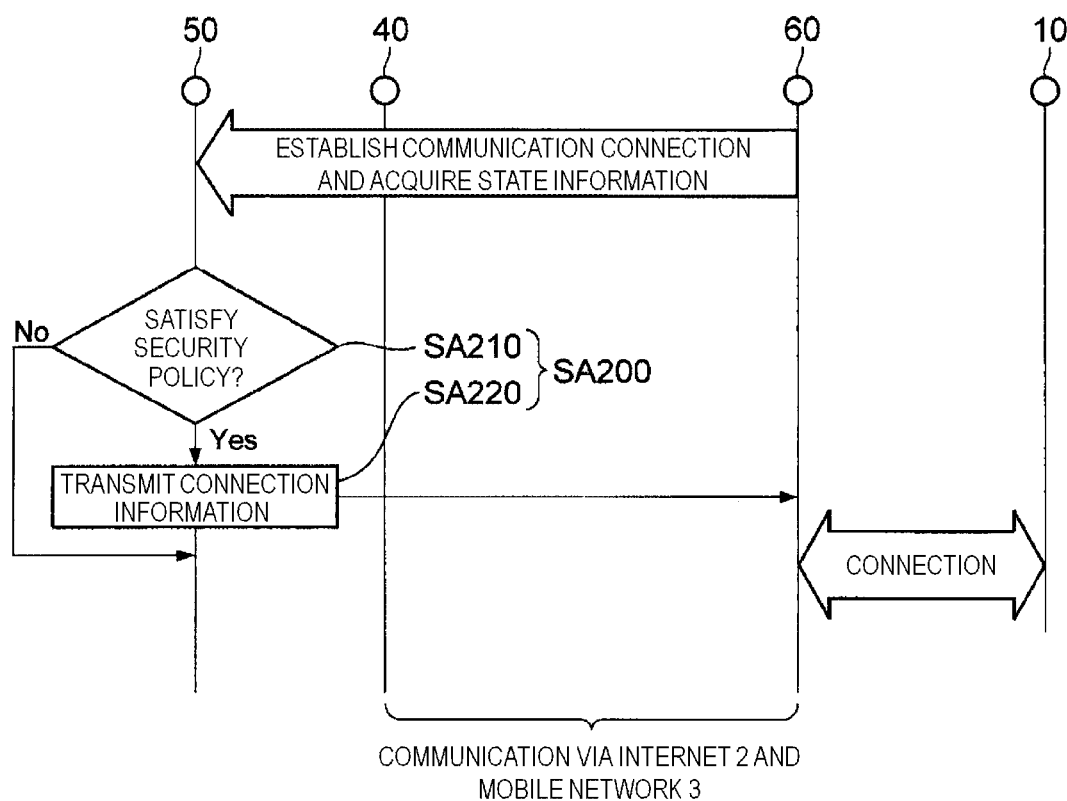
FIG. 5 is a diagram illustrating the communication sequence in the embodiment.

FIG. 5 is a sequence flowchart illustrating a flow of communication in the quarantine process. As illustrated in FIG. 5, the control unit 510 of the terminal management device 50 establishes a communication connection via the Internet 2 and the mobile network 3 using a device (in this operation example, the wireless terminal 60) indicated by the MAC address notified from the AP controller 30 as a partner device, and acquires state information. Subsequently, the control unit 510 determines whether or not a state indicated by state information acquired from the wireless terminal 60 satisfies a predetermined security policy (that is, a security policy indicated by the security policy data) (step SA210).

Also, only when the state of the wireless terminal 60 satisfies the security policy (when a determination result in step SA210 is "Yes"), the control unit 510 transmits the connection information required at the time of establishment of a wireless communication connection with the wireless access point device 10 to the wireless terminal 60 via the Internet 2 and the mobile network 3, and stores the information (step SA220). Further, the control unit 510 notifies the AP controller 30 of the MAC address of the wireless terminal 60 (not illustrated in FIG. 5). When the AP controller 30 receives the MAC address from the terminal management device 50, the AP controller 30 provides an updating instruction to update the MAC address filter to permit a connection of the terminal identified by the MAC address to the wireless network system 1, to each wireless access point device 10-*n* (n=1 to N). Each wireless access point device 10-*n* (n=1 to N) updates the MAC address filter according to the updating instruction.

The wireless terminal 60 connects to the nearest wireless access point device 10 using the connection information received from the terminal management device 50. As described above, in the wireless access point device 10, setup of the MAC address filter to permit the connection of the wireless terminal 60 is performed. Therefore, the wireless terminal 60 is connected to the wireless network system 1 via the nearest wireless access point device 10. On the other hand, when the state of the wireless terminal 60 does not satisfy the security policy, the connection information is not transmitted from the terminal management device 50 to the wireless terminal 60. Further, the MAC address of the wireless terminal 60 is not notified from the terminal management device 50 to the AP controller 30, and updating of the MAC address filter of the wireless access point device 10 to permit the connection of the wireless terminal 60 is not performed. Therefore, the wireless terminal 60 is not connected to the wireless network system 1. Therefore, the wireless terminal 60 is connected to the wireless network system 1 only when the wireless terminal 60 satisfies the predetermined security policy, and thus, a terminal which does not satisfy the security policy can be reliably prevented from being connected to the in-company network via the wireless network system 1. Even when the wireless terminal 60 does not satisfy the security policy and is not connected to the wireless network system 1, the wireless terminal 60 can be, of course, connected to a different wireless network system (for example, WI-FI) from the wireless network system 1 and can, of course, access the Internet 2 via such other wireless communication networks or the mobile network 3.

When the wireless terminal 60 is connected to the wireless network system 1 in the above manner, the control unit 510 of the terminal management device 50 periodically acquires the state information from the wireless terminal 60 via the router 40, the switching hub 20, and the wireless access point device 10, and confirms that the state information satisfies the security policy. Also, when the state of the wireless terminal 60 does not satisfy the security policy, the control unit 510 deletes the connection information of the wireless network system 1 from the wireless terminal 60, notifies the AP controller 30 of the MAC address of the wireless terminal 60, and updates the MAC address filter of the wireless access point device 10 again to exclude the wireless terminal 60 from a connection target. This is because it is not preferable for a wireless terminal not satisfying the security policy to continue to be connected from the viewpoint of ensuring security, and is intended to prevent fraudulence such as the setup of the wireless terminal 60 being changed after connection to the wireless access point device is completed.

When the user of the wireless terminal 60, for example, leaves an office, the wireless terminal 60 moves outside the service area of the wireless access point device 10, and the connection is disconnected, the wireless access point device 10 notifies the AP controller 30 of the MAC address of the wireless terminal 60 to inquiry whether or not handover occurs. The AP controller 30 confirms whether or not the wireless terminal 60 is handed over to another wireless access point device 10. When the wireless terminal 60 is not handed over, the AP controller 30 notifies the terminal management device 50 of the MAC address of the wireless terminal 60. The control unit 510 of the terminal management device 50 communicates the wireless terminal indicated by the MAC address via the Internet 2 and the mobile network 3, and deletes the connection information stored in the wireless terminal. This is intended to prevent the connection information distributed on the condition that the security policy is satisfied from being fraudulently used.

It should be noted here that it is not necessary to separately provide a quarantine VLAN for determining whether or not the wireless terminal 60 satisfies the predetermined security policy, and an increase in costs for initial setup or operation does not occur. Thus, according to the present embodiment, it is possible to realize that only a terminal satisfying the security policy is connected to the in-company network without causing a significant increase in costs. While in the above embodiment, the case in which the in-company network that is a protection target of the security policy includes the wireless network system 1 and the wired LAN has been described, it is understood that the in-company network includes only the wireless network system 1.

(C: Modification)

While the embodiments of the present invention have been described above, it is understood that the present embodiment is modified as follows.

(1) In the above embodiment, the determination as to whether or not the wireless terminal 60 satisfies the security policy is performed in response to the wireless terminal 60 entering the company building in which the wireless network system 1 is provided, and when the wireless terminal 60 satisfies the security policy, the connection information required at the time of connecting to the wireless access point device 10 is provided from the terminal management device 50 to the wireless terminal 60 via the Internet 2 and the mobile network 3. However, the connection information may be provided to the wireless terminal 60 before the wireless terminal 60 enters the company building (in other words, before the wireless terminal 60 is detected by the wireless access point device 10). However, in this case, there is a drawback that it is necessary to frequently perform communication between the wireless terminal 60 and the terminal management device 50 via the Internet 2 and the mobile network 3 in order to confirm that the wireless terminal 60 satisfies the predetermined security policy, and this satisfaction state is continued, and consumption of the battery of the wireless terminal 60 increases. Therefore, it is preferable to determine whether or not the wireless terminal 60 satisfies the security policy in response to the wireless terminal 60 having entered the company building in which the wireless network system 1 is provided, as in the above embodiment.

(2) In the above embodiment, the wireless access point device 10 for accommodating the wireless terminal in the wireless network system 1 has the role of the sensor that detects that the wireless terminal 60 has entered the company building in which the wireless network system 1 is provided. However, it is understood that a sensor that detects that the wireless terminal 60 has entered the company building in which the wireless network system 1 is provided may be provided separately from the wireless access point device 10 despite the disadvantage that extra investment into facilities is required unlike the above embodiment.

(3) While in the above embodiment, the wireless network system 1 includes the AP controller 30 and the terminal management device 50 as separate devices, it is understood that the communication system may include the AP controller 30 and the terminal management device 50 as an integral device. In this case, a device having the functions of both of the AP controller 30 and the terminal management device 50 becomes a high-level device with respect to the wireless access point device 10. While in the above embodiment, the wireless access point device is caused to execute the determination as to whether or not the wireless terminal is of which the use has been applied in advance, the AP controller 30 may be caused to perform the determination, and the wireless access point device may be caused to perform only the determination as to whether or not radio wave intensity of the received probe request exceeds a predetermined threshold value.

Further, in the above embodiment, the wireless access point device 10 is caused to execute the terminal notification process of notifying the high-level device of the MAC address and a process of updating the MAC address filter in response to an instruction from the device when the intensity of radio waves of the probe request received from the wireless terminal exceeds a predetermined threshold value, and the MAC address of the wireless terminal (that is, a terminal identifier of the wireless terminal) has been registered in advance. However, the switching hub 20 or the router 40 may be caused to execute each of the processes. For example, when the router 40 is caused to execute each process, the terminal notification unit that executes a process of acquiring radio wave intensity of a request message transmitted from the wireless terminal (for example, a SYN message requesting of establishment of a communication connection to a partner device) from the wireless access point device in response to reception of the request message, and notifying a high-level device (terminal management device 50) of the terminal identifier when the radio wave intensity exceeds a predetermined threshold value and the terminal identifier of the wireless terminal (for example, an IP address of a transmission source of the request message) has been registered in advance, and updating part for executing a process of updating a filter (for example, a filter regarding the IP address) for limiting wireless terminals communicating via the router according to an instruction from the high-level device may be provided in the router 40. Further, the router 40 may be a wireless router having the function of the wireless access point device, and the switching hub 20 may be a wireless switching hub having the function of the wireless access point device. In short, an aspect may be adopted in which terminal notification part for notifying the high-level device of the terminal identifier of the wireless terminal when radio wave intensity of the request message received from the wireless terminal exceeds a predetermined threshold value, and the terminal identifier of the wireless terminal has been registered in advance, and updating part for updating a filter for limiting wireless terminals communicating via the wireless relay device according to an instruction from the high-level device may be provided in the wireless relay device (a wireless access point device, a wireless switching hub, or a wireless router) relaying communication between the wireless terminal and a communication party.

(4) While in the above embodiment, the wireless network system 1 includes the wireless access point device 10 and the terminal management device 50 as separate devices, the communication system may include the wireless access point device 10 and the terminal management device 50 as an integral device. That is, it is not necessary to prepare the terminal management device 50 as separate hardware for management of the terminal, and the terminal management device 50 can be set, for example, as software in any device.

(5) In the above embodiment, the program for causing the terminal management device 50 to realize the function specific to the terminal management device of the present invention has been stored in the non-volatile storage unit 534 of the terminal management device 50. However, the program may be written to a computer-readable recording medium, such as a CD-ROM, and may be distributed. Further, the program may be distributed through downloading via an electrical communication line, such as the Internet. This is because a general computer is operated according to the computer program distributed according to this manner, and thus, the computer functions as the terminal management device of the above embodiment. The same applies to the wireless communication program stored in the non-volatile storage unit 134 of the wireless access point device 10.

(6) In the above embodiment, in order for the wireless terminal 60 to be able to connect to the wireless network system 1 (communicate with the wireless access point device 10), the terminal management device 50 performs the determination as to the security policy of the wireless terminal 60 via the Internet 2 and the mobile network 3, and then, provides the connection information required at the time of connection to the wireless access point device 10 to the wireless terminal 60 via the Internet 2 and the mobile network 3 when the wireless terminal 60 satisfies the security policy. However, communication for performing the determination as to the security policy or transmission of the connection information required at the time of connection to the wireless access point device 10 is not limited to via the Internet 2 and the mobile network 3, and may be via another communication part. For example, infrared, Bluetooth (registered trademark), or Near Field Communication (NFC) may be used.

This application is based on Japanese Patent Application No. 2013-059464 filed on Mar. 22, 2013, the contents of which are hereby incorporated by reference.

INDUSTRIAL APPLICABILITY

According to the present invention, only a wireless terminal satisfying a security policy can be connected to an in-company network without causing a significant increase in costs.

REFERENCE SIGNS LIST

1: Wireless network system,
2: Internet,
3: Mobile network,
10-$n$ ($n=1$ to N) and 10: Wireless access point device,
20: Switching hub,
30: AP controller,
40: Router,
50: Terminal management device,
60: Wireless terminal,
110 and 510: Control unit,
120: Wireless communication I/F unit,
520: Communication I/F unit,
130 and 530: Storage unit,
132 and 532: Volatile storage unit,
134 and 534: Non-volatile storage unit,
540: Bus.

The invention claimed is:
1. A wireless network system including a wireless relay device and a terminal management device, wherein the terminal management device comprises:
a CPU that is configured to:

communicate with a wireless terminal via a different communication network from the wireless network system;
receive state information indicating a state of the wireless terminal from the wireless terminal;
determine whether or not the wireless terminal satisfies a predetermined security policy based on the state information indicating the state of the wireless terminal;
transmit connection information for connection to the wireless relay device to the wireless terminal which is determined to satisfy the security policy; and
transmit a unique identifier of the wireless terminal to the wireless relay device to cause the wireless relay device to update a filter such that the wireless terminal is allowed to be connected to the wireless network system, wherein
the terminal management device, the wireless relay device, and the wireless terminal are each remotely distinct and separate entities,
wherein the CPU is also configured to: periodically receive state information indicating a state of the wireless terminal from the wireless terminal, and when the state of the wireless terminal does not satisfy the security policy, delete the connection information from the wireless terminal and cause the wireless relay device to update the filter to exclude connection of the wireless terminal to the wireless network system, wherein
the determine whether or not the wireless terminal satisfies a predetermined security policy is based on the state information indicating the state of the wireless terminal, and
the connection information for connection to the wireless relay device is transmitted to the wireless terminal when the state of the wireless terminal is determined to satisfy the security policy.

2. The wireless network system according to claim 1, wherein the CPU transmits the connection information via the different communication network from the wireless network system.

3. The wireless network system according to claim 1, further comprising:
a detection device that detects that the wireless terminal enters a service area of the wireless network system,
wherein the CPU of the terminal management device performs a determination as to the security policy on the wireless terminal which is detected to enter the service area of the wireless network system by the detection device.

4. The wireless network system according to claim 3, wherein the wireless relay device functions as the detection device.

5. The wireless network system according to claim 1, wherein the state information indicating the state of the wireless terminal includes install data indicating a type or a version of an OS and application software installed in the wireless terminal.

6. The wireless network system according to claim 5, wherein the CPU of the terminal management device is configured to determine whether or not the wireless terminal satisfies the predetermined security policy according to a comparison between the install data received from the wireless terminal and security policy data stored in the terminal management device.

7. A terminal management device comprising:
a CPU that is configured to:
communicate with a wireless terminal via a different communication network from a wireless network system including a wireless relay device;
receive state information indicating a state of the wireless terminal from the wireless terminal;
determine whether or not the wireless terminal satisfies a predetermined security policy based on the state information indicating the state of the wireless terminal;
transmit connection information for connection to the wireless relay device to the wireless terminal which is determined to satisfy the security policy; and
transmit a unique identifier of the wireless terminal to the wireless relay device to cause the wireless relay device to update a filter such that the wireless terminal is allowed to be connected to the wireless network system, wherein
the terminal management device, the wireless relay device, and the wireless terminal are each remotely distinct and separate entities
wherein the CPU is also configured to: periodically receive state information indicating a state of the wireless terminal from the wireless terminal, and when the state of the wireless terminal does not satisfy the security policy, delete the connection information from the wireless terminal and cause the wireless relay device to update the filter to exclude connection of the wireless terminal to the wireless network system, wherein
the determine whether or not the wireless terminal satisfies a predetermined security policy is based on the state information indicating the state of the wireless terminal, and
the connection information for connection to the wireless relay device is transmitted to the wireless terminal when the state of the wireless terminal is determined to satisfy the security policy.

8. A wireless relay device included in a wireless network system, the wireless relay device comprising:
a CPU that is configured to:
transmit, to a terminal management device, a terminal identifier of a wireless terminal when radio wave intensity of a request message received from the wireless terminal exceeds a predetermined threshold value and when the transmitted terminal identifier of the wireless terminal matches one of a registered terminals list; and
update a filter for limiting wireless terminals of communicating via the wireless relay device according to an instruction from the terminal management device, wherein
the CPU updates the filter such that the wireless terminal is allowed to be connected to the wireless network system when instructed from the terminal management device, wherein
the terminal management device, the wireless relay device, and the wireless terminal are each remotely distinct and separate entities.

9. The wireless relay device according to claim 8, wherein the request message is a probe request, the terminal identifier is a MAC address, and the filter is a MAC address filter.

10. The wireless relay device according to claim 8, wherein the CPU connects to the wireless terminal which has obtained connection information for connection to the wireless relay device via a different communication network from the wireless network system, and perform communication using the wireless network system with the wireless terminal.

11. The wireless relay device according to claim 8, wherein the wireless relay device is a wireless access point device.

12. The wireless relay device according to claim 8, wherein the wireless relay device is a wireless switching hub.

13. The wireless relay device according to claim 8, wherein the wireless relay device is a wireless router.

14. A communications method comprising:
communicating with a wireless terminal via a different communication network from a wireless network system including a wireless relay device, and determining whether or not the wireless terminal satisfies a predetermined security policy;
receiving a state information indicating a state of the wireless terminal from the wireless terminal;
transmitting connection information for connection to the wireless relay device to the wireless terminal which is determined to satisfy the security policy based on the state information indicating the state of the wireless terminal; and
transmitting a unique identifier of the wireless terminal to the wireless relay device to cause the wireless relay device to update a filter such that the wireless terminal is allowed to be connected to the wireless network system, wherein
the wireless terminal communicates with a terminal management device, and
the terminal management device, the wireless relay device, and the wireless terminal are each remotely distinct and separate entities
the communications method further comprising:
periodically receiving state information indicating a state of the wireless terminal from the wireless terminal, and
deleting, when the state of the wireless terminal does not satisfy the security policy, the connection information from the wireless terminal and causing the wireless relay device to update the filter to exclude connection of the wireless terminal to the wireless network system, wherein
the determine whether or not the wireless terminal satisfies a predetermined security policy is based on the state information indicating the state of the wireless terminal, and
the connection information for connection to the wireless relay device is transmitted to the wireless terminal when the state of the wireless terminal is determined to satisfy the security policy.

15. The communications method according to claim 14, wherein the connection information is transmitted via the different communication network from the wireless network system.

16. The communications method according to claim 14, further comprising:
detecting that the wireless terminal enters a service area of the wireless network system,
wherein a determination is performed as to the security policy on the wireless terminal which is detected to enter the service area of the wireless network system.

17. The communications method according to claim 14, wherein the unique identifier is a MAC address, and the filter is a MAC address filter.

18. A communications method in a wireless relay device included in a wireless network system, the communications method comprising:
transmitting, to a terminal management device, a terminal identifier of a wireless terminal when radio wave intensity of a request message received from the wireless terminal exceeds a predetermined threshold value and when the transmitted terminal identifier of the wireless terminal matches one of a registered terminals list; and
updating a filter for limiting wireless terminals of communicating via the wireless relay device according to an instruction from the terminal management device, wherein
the filter is updated such that the wireless terminal is allowed to be connected to the wireless network system when instructed from the terminal management device, and
the terminal management device, the wireless relay device, and the wireless terminal are each remotely distinct and separate entities.

19. The communications method according to claim 18, wherein the request message is a probe request, the terminal identifier is a MAC address, and the filter is a MAC address filter.

20. The communications method according to claim 18, further comprising:
connecting to the wireless terminal which has obtained connection information for connection to the wireless relay device via a different communication network from the wireless network system; and
performing communication using the wireless network system with the wireless terminal.

21. The communications method according to claim 18, further comprising:
periodically acquiring state information of the wireless terminal from the wireless terminal,
confirming whether the state information satisfies the security policy, and
when the state information does not satisfy the security policy, deleting the connection information of the wireless network system, and causing the wireless relay device to update the filter such that the wireless terminal is excluded from the wireless network system.

22. The communications method according to claim 18, wherein further comprising:
causing the wireless terminal to delete the connection information of the wireless network system when connection of the wireless terminal to the wireless relay device is disconnected, and when the wireless terminal is not handed over to another wireless relay device.

* * * * *